(12) United States Patent
Baumgartenn

(10) Patent No.: US 10,584,060 B2
(45) Date of Patent: Mar. 10, 2020

(54) PROCESS AND SYSTEM FOR ELIMINATING THE POTENTIAL FOR LD AND EAF STEEL SLAG EXPANSION

(71) Applicant: Rolth do Brasil Indústria Comércio e Serviços Ltda., Campinas, Sao Paulo (BR)

(72) Inventor: Sidnei Luiz Baumgartenn, Pinhais PR (BR)

(73) Assignee: ROLTH DO BRASIL INDUSTRIA, COMERCIO E SERVICOS LTDA, Campinas (BR)

(*) Notice: Subject to any disclaimer, the term of this patent is extended or adjusted under 35 U.S.C. 154(b) by 300 days.

(21) Appl. No.: 15/512,686

(22) PCT Filed: Sep. 14, 2015

(86) PCT No.: PCT/BR2015/050148
§ 371 (c)(1),
(2) Date: Jul. 25, 2017

(87) PCT Pub. No.: WO2016/041039
PCT Pub. Date: Mar. 24, 2016

(65) Prior Publication Data
US 2017/0349484 A1 Dec. 7, 2017

(30) Foreign Application Priority Data
Sep. 19, 2014 (BR) ............................ 102014023373

(51) Int. Cl.
*C04B 5/00* (2006.01)
*B02C 11/08* (2006.01)
(Continued)

(52) U.S. Cl.
CPC ............... *C04B 5/00* (2013.01); *B02C 11/08* (2013.01); *B02C 21/00* (2013.01); *B02C 23/10* (2013.01);
(Continued)

(58) Field of Classification Search
CPC ......... B02C 23/20; B02C 23/14; B02C 23/38; B02C 23/10; C04B 5/00
See application file for complete search history.

(56) References Cited

U.S. PATENT DOCUMENTS

| 7,494,079 B1 * | 2/2009 | Siracusa | ................. B02C 21/00 110/220 |
| 2014/0166787 A1 * | 6/2014 | Gillis | ..................... C22B 7/005 241/19 |

(Continued)

FOREIGN PATENT DOCUMENTS

| BR | PI1103723 | 1/2013 |
| CN | 101928793 A | 12/2010 |

(Continued)

*Primary Examiner* — Faye Francis
(74) *Attorney, Agent, or Firm* — Brinks Gilson & Lione

(57) ABSTRACT

A process and system having a primary crusher to reduce the fragments according to their granulometry; a magnetic separator to remove metallic fragments bigger than a determined granulometry; a rotary dryer to dry slag; an impact mill to disaggregate and fragment slag particles; a classifier for aero-classification and drag of fine and superfine particles; a cooler for cooling slag by means of heat exchange and removal of the fine and superfine particles that were not collected by the impact mill a vibrating sieve provided with two or more decks with screens of predetermined sizes; low-intensity magnetic separators, with generation of non-magnetic slag fractions free from metallic iron and from iron monoxide, and of magnetic fractions composed by metallic iron and iron monoxide; and low-intensity magnetic separators to reprocess the magnetic fractions with generation of (Continued)

concentrate with high metallic iron contents and a product with high concentration of iron monoxide.

32 Claims, 3 Drawing Sheets

(51) Int. Cl.
| | |
|---|---|
| *C21C 5/36* | (2006.01) |
| *C04B 18/14* | (2006.01) |
| *B02C 21/00* | (2006.01) |
| *B02C 23/10* | (2006.01) |
| *B02C 23/14* | (2006.01) |
| *B02C 23/20* | (2006.01) |
| *B02C 23/38* | (2006.01) |
| *B07B 1/36* | (2006.01) |
| *B07C 5/344* | (2006.01) |

(52) U.S. Cl.
CPC ............. *B02C 23/14* (2013.01); *B02C 23/20* (2013.01); *B02C 23/38* (2013.01); *B07B 1/36* (2013.01); *B07C 5/344* (2013.01); *C04B 18/14* (2013.01); *C04B 18/142* (2013.01); *C21C 5/36* (2013.01); *B07B 2201/04* (2013.01); *B07C 2501/0036* (2013.01); *C21C 2005/363* (2013.01); *Y02W 30/94* (2015.05)

(56) References Cited

U.S. PATENT DOCUMENTS

| | | | |
|---|---|---|---|
| 2014/0262968 A1* | 9/2014 | Fritz | .......................... C22B 7/04 209/12.1 |
| 2015/0203928 A1 | 7/2015 | Thome et al. | |
| 2016/0045841 A1* | 2/2016 | Kaplan | ................ B01J 19/0093 429/49 |
| 2016/0129454 A1* | 5/2016 | Fritz | .......................... C22B 7/04 241/20 |

FOREIGN PATENT DOCUMENTS

| | | |
|---|---|---|
| JP | H06256814 A | 9/1994 |
| KR | 20140140432 A | 12/2014 |

* cited by examiner

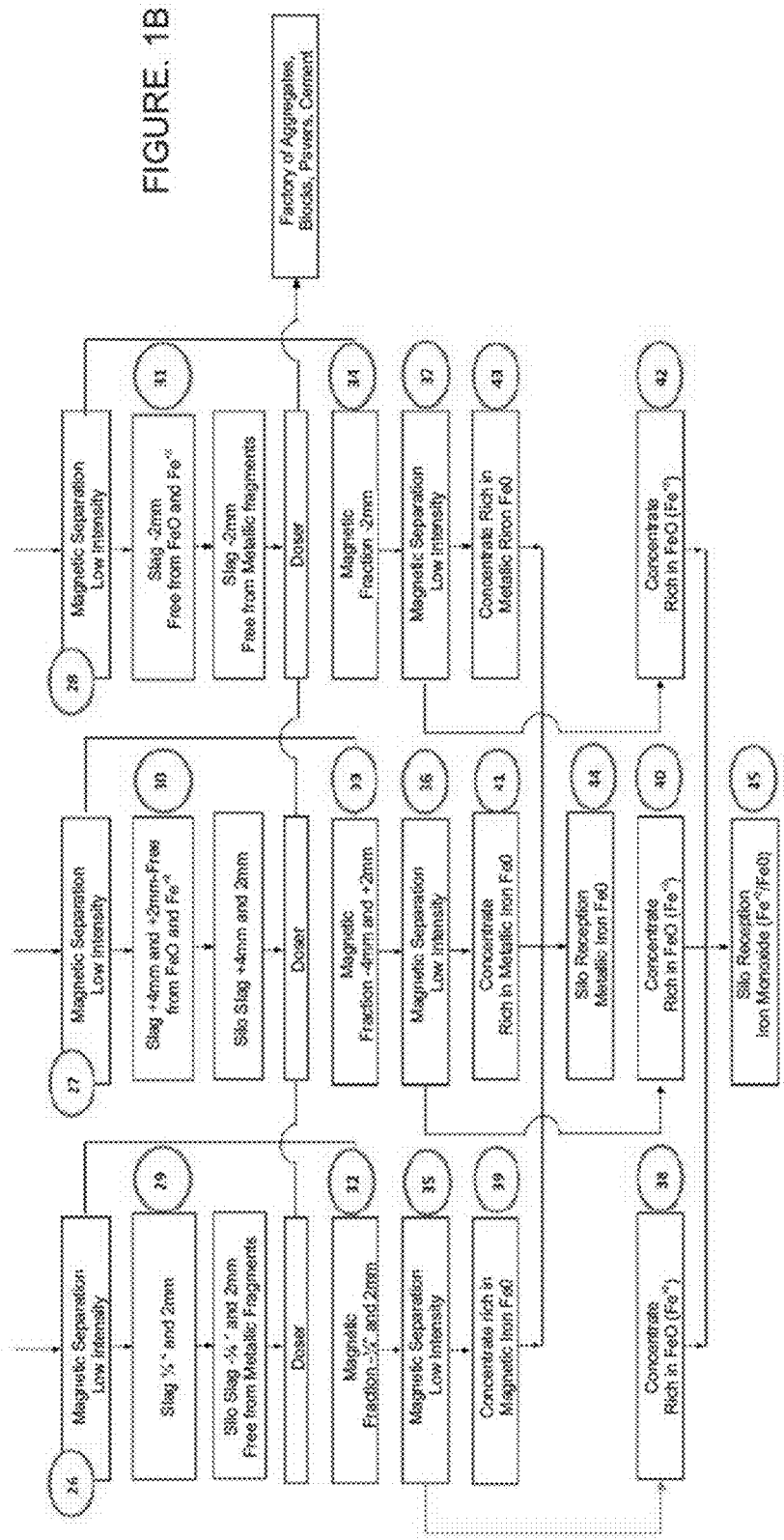

PROCESS AND SYSTEM FOR ELIMINATING THE POTENTIAL FOR LD AND EAF STEEL SLAG EXPANSION

CROSS-REFERENCE TO RELATED APPLICATIONS

This application claims the benefit of priority to PCT/BR2015/050148, filed Sep. 14, 2015, which claims priority to Brazilian Patent No. BR102014023373-3, filed Sep. 19, 2014, the entire contents of which is incorporated herein by reference.

TECHNICAL FIELD OF THE INVENTION

The present invention relates to a process for eliminating the expandability of slag from LD and LE steel plant, with a view to removal the expandable elements present in the slag from steel plant.

By means of the process of the present invention, after elimination of the expandability of slag, it is possible to obtain products in the area of making cement aggregates, such as pavers, blocks, big tubes and others, as well as to recycle the metallic materials present in the steel-plant slag, iron monoxides (FeO) to be used as raw material for sintering in the production of steel in the steel industry itself that has generated the slag, and further to obtain a product that is rich in free CaO and MgO, which can be used in agriculture as soil corrective. Therefore, according to the process of the present invention it is possible to recycle all the compounds generated, eliminating any need for disposal thereof in industrial landfills.

BACKGROUND OF THE INVENTION

Steel-plant slag is generated in the process of making steel, resulting from the transformation of liquid pig iron into steel.

The Brazilian steel industry represents yearly production of 36 million tons steel, wherein for each ton of steel produced an average of 110 to 120 kg of slag from LD and LE steel plant are produced. One estimates a production of up to six million tons/year of steel-plant slag, which are classified environmentally as "Non-inert Class II Residue" and present expansive properties.

PRIOR ART

In the process of transforming pig iron into steel by means of the LD converter (Linz-Donawits Process), one uses gaseous oxygen, which promotes the burning of carbon and silicone, wherein the flux and fluxing agents (CaO, CaO.MgO and CaF2) are added for cleaning the steel (desulfurization and dephosphorization). In electric voltaic-arc furnaces, the graphite electrodes and the metallic scrap open the arc, initiating the process of melting the metallic charge, so that the presence of oxygen from the scrap and the injected oxygen promote the boiling of the liquid bath, the objective of which is to remove elements that are harmful to the quality of the steel, such as phosphor, nitrogen and non-metallic inclusions incorporated into the slag. In the boiling process by injection of oxygen into both the LD converter and the voltaic-arc electric furnaces, one incorporates into the slag metallic iron (Fe0) and iron monoxide (FeO or Fe+2). The fluxes and fluxing agents (CaO, CaO.MgO and CaF2) are added in excess, the CaO and MgO parts remaining free, without taking part in the formation of slag.

This process takes place at a temperature of up to 1500° C., so that the liquid slag is removed rapidly into the pot, until the liquid steel becomes visible. The slag is transported to the dumping yard, known as slag yard. In order for the slag to be handled for recovery of metallic slurries, one carries out the water-jet cooling process. In this rapid cooling process, the slag tends to crystallize in a disorderly manner, forming vitreous crystals of amorphous structure, in which the innermost part of the slag will undergo slower cooling, forming quite more crystallized crystals, forming grains with higher strength.

Therefore, analyzing all the components present in the slag, one observes that the elements free CaO, free MgO, metallic iron (Fe0) and iron monoxide (FeO or Fe+2) exhibit expandability.

Free CaO and MgO in contact with moisture (H2O) tend to become hydrated, forming Ca(OH)2 and Mg(OH)2; CaO and MgO in contact with CO2 tend to form CaCO3 and MgCO3. Metallic iron (Fe0) in contact with oxygen (O2) tends to become oxidized in a first step into iron monoxide (FeO), in a second step into iron dioxide (Fe2O3); and in the presence of water, it tends to form hydrated iron oxide, according to the general equation of rust formation:

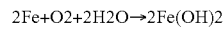

2Fe+O2+2H2O→2Fe(OH)2

In the latter oxidation process, more hydration of iron, the expandability may be 600 times as high. The process according to the present invention consists of a step of drying the slag at a temperature of 120° C., followed by a disaggregation and fragmentation step using impacting mills and/or semi-autogenous mills, an aero-classification step, for removal of expandability elements, which are free CaO and MgO, since they exhibit fine granulometry and, as a result, they are liable to be collected in the aero-classification step, the slag undergoing a process of classification by size, and for each fraction there is low-intensity magnetic separation to remove metallic iron (Fe0) and iron monoxide (FeO).

In the process of cooling the steel-plant slag with water, a very rapid cooling occurs, which causes the elements to group in a disorderly manner, forming compounds, with an amorphous crystalline structure. This thermal shock creates hydraulicity properties in the slag. In the process of the present invention, the slag drying at 120° C. promotes dehydration of the amorphous crystals, reacquiring hydraulicity properties.

The chemical composition of the steel-plant slag, CaO+MgO+SiO2+Al2O3+iron, when subjected to temperatures of up to 1500° C., tend to form similar compounds present in the clinker, for example: tricalcium silicate (3CaO.MgO2SiO2), dicalcium silicate (2CaO.SiO2) and tricalcium aluminate (3CaO.Al2O3), and provides the hydraulicity property of the amorphous crystals, which imparts to the cementitious properties similar to clinker.

At present, steel-plant slags have been widely used as road substrates. However, it is necessary to eliminate the expandability process. Among known processes for elimination of expandability, one of them consists in making the cure of the material by hydration and carbonation, which may require up to six months; the natural cure in a period of up to two years; and the forced cure by vapor for a period of 48 hours. This technique requires the consumption of a large amount of water and a large storage area, which makes it unviable from the ecological and financial point of view and it certainly remains a great drawback to the steel industry.

Once we have identified the elements that cause expandability, the objective of the present invention consists in providing a process pathway to remove them.

OBJECTIVES OF THE INVENTION

Therefore, the main objective of the present invention is to eliminate the expandability of slag, without the need for cure by hydration and carbonation, besides eliminating all the elements that might undergo expansion, such as r: free CaO and free MgO. metallic iron (Fe0) and iron monoxide (FeO).

Thus, the advantages of the process of the present invention in eliminating expandability consist in:
diminishing the size of the stocking yard of steel-plant slag;
generating products of greater added value;
total utilization of all the products and by-products generated in the process of eliminating the expandability of steel-plant slag;
elimination of the environmental liability;
partial replacement of cement in making cementitious aggregates, such as: pavers, blocks, draining concrete and others;
raising the strength (MPa) of the cementitious aggregates;
partial replacement of the clinker in the production of cement;
moreover, the present invention enables one to obtain raw materials and products with the following applications:
aggregates for making all the cementitious products, such as interlocked floors of low, medium and high (MPa), apparent and structural sealing blocks, grout and caissons;
obtaining fine and superfine powders containing free CaO and MgO, used in agriculture as soil corrective and also in the correction of pH in acidic effluents;
obtaining metallic iron with over 75% purity to replace the scrap in the process of cooling liquid steel;
obtaining a product rich in iron monoxide (FeO or Fe+2), which must return to sintering as a charge for blast furnace for making pig iron;
reacquiring the hydraulicity properties of the slag with the dehydration process, promoted by the process of the present invention, similar to clinker. This is the process by which the material hardens through reaction with water and, therefore, being used to replace cement and raising the strength of cement.

DETAILED DESCRIPTION OF THE INVENTION

Figure 1A:
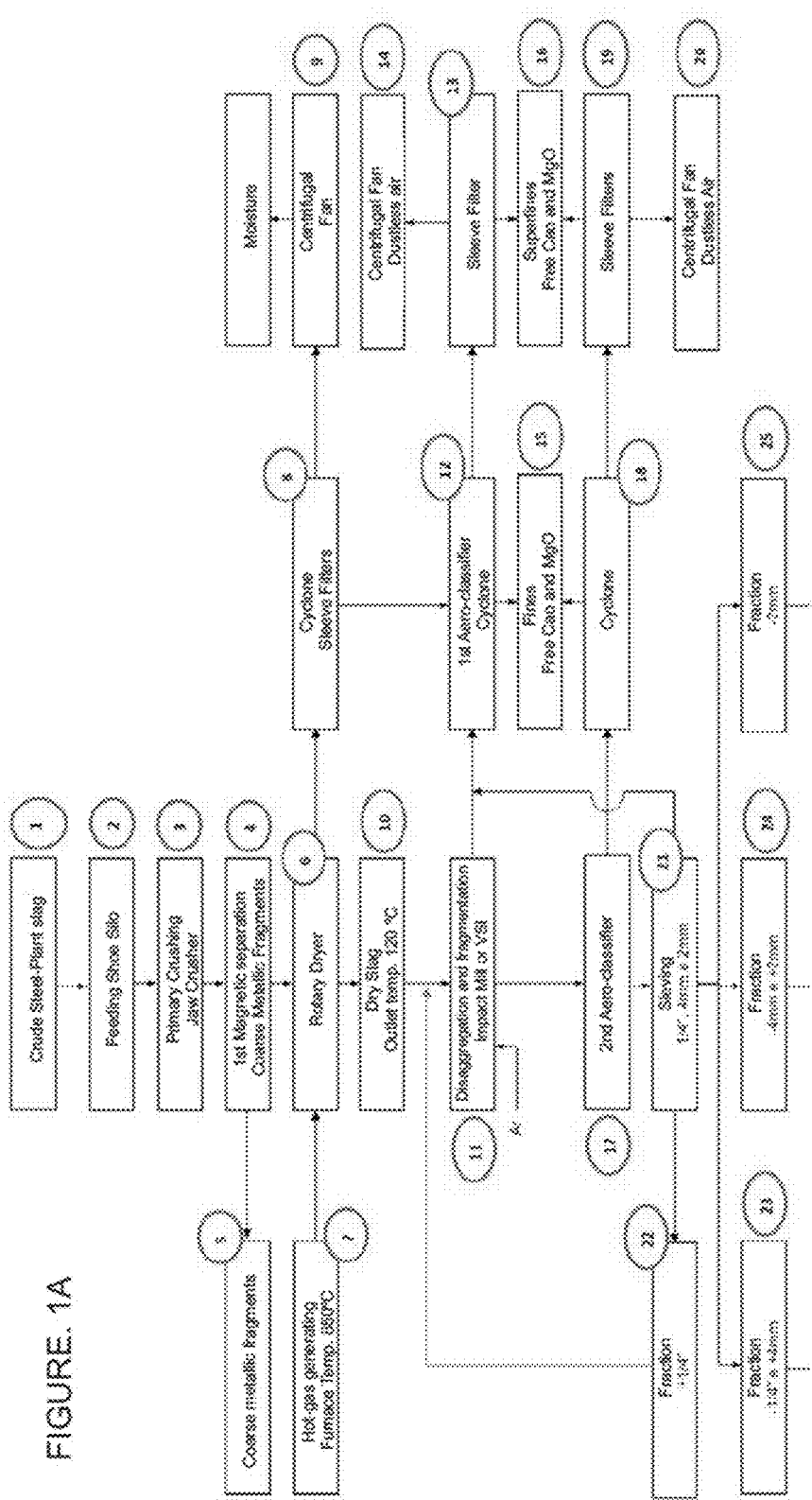
FIG. 1 is a flow diagram of the process of recycling stag, which eliminates the elements that cause expandability.
Figure 2:
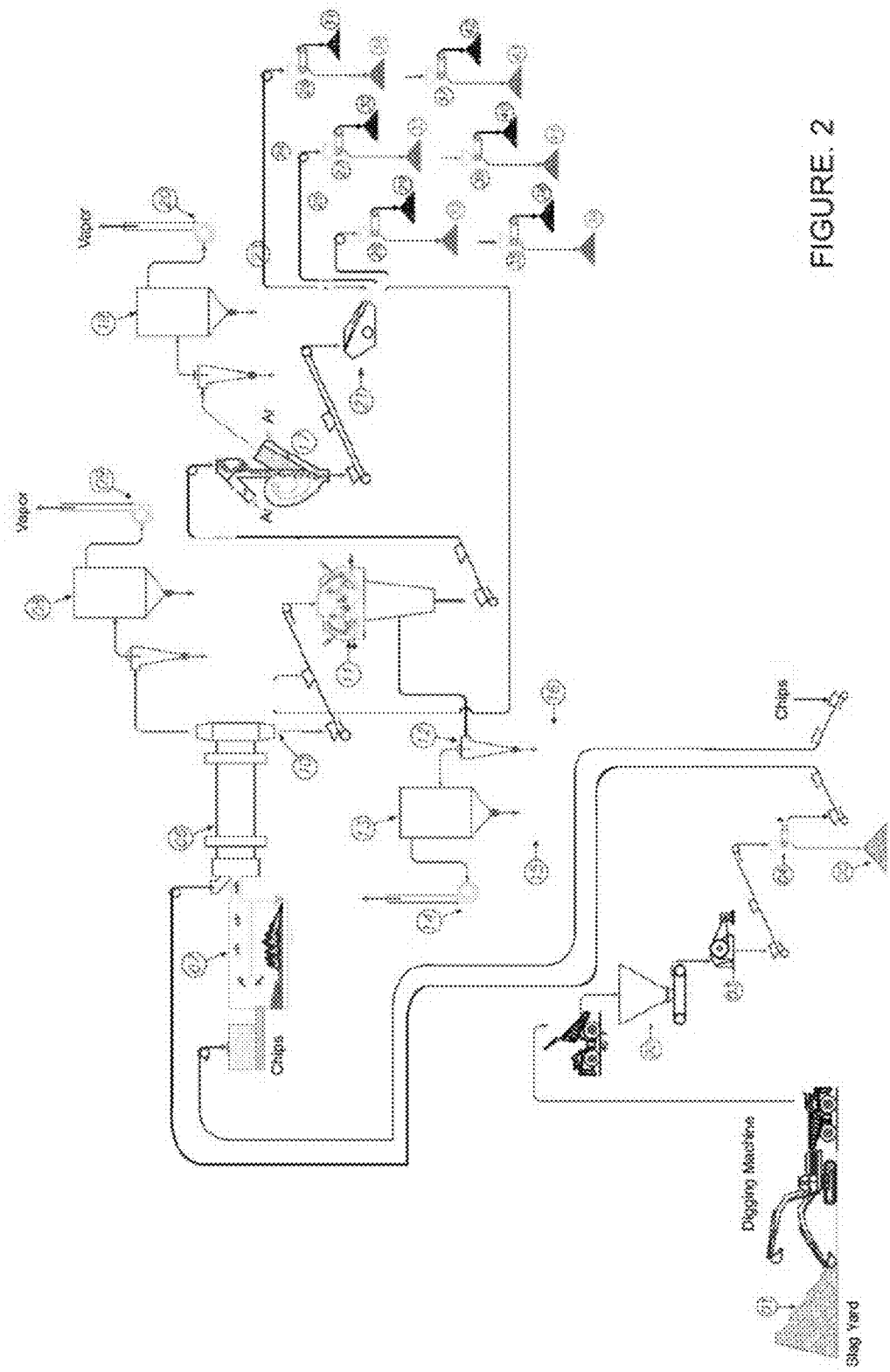
FIG. 2 is a schematic diagram with the steps of the process of recycling slag, which eliminates the elements that cause expandability.

In FIGS. 1 and 2, it is possible to understand the characteristics of the process of recycling slag that eliminates the elements that cause expandability, which comprises the steps discussed hereinafter.

The crude steel-plant slag 1 is disposed in the slag Yard, available after the primary treatment of the steel-plant slag, which comprises the following steps: removing the larger metallic slurries, followed by crushing and magnetic separation to remove the larger metallic fragments. At the end of the process, slags separated by difference in size are generated. For example, slags of types #2 and 0 (zero), wherein slag #2 has medium size of 4 inches and slag 0 is equal too r smaller than 2 inches.

Then, the slag is transported by dump truck to the improvement unit and feeds a silo, which is equipped with a shoe feeder 2. In a configuration of the invention given by way of example, the silo 2 may have capacity of about 30 m3.

The shoe feeder removes the crude slag from the silo 2 and feeds a primary crusher 3, which may be a mobile crushing central #8060, such as a jaw crusher, so as to reduce the fragments down to a grain size smaller than 2 inches. The crushing process is carried out by using the natural moisture of the slag. For slag 0 (zero) this primary crushing step 3 is not necessary, so that it may deviate from the primary crusher 3.

After the primary crushing for the steel-plant slag #2, the material is collected and transported to the magnetic separator 4 for removal of larger metallic fragments, which are called coarse metallic fragments 5.

The slag free from coarse metallic fragments 5 is collected and transported to a Rotary dryer 6. The feeding of the Rotary dryer 6 may be with hot gas provided by a mobile grill furnace 7, which has, as source of energy, biomass, such as: pellet or eucalyptus chips, fragments of used pellets, residues from civil construction, pruned leaves and branches from native trees and other sources of biomass. The mobile grill furnace preferably generates hot gas at a temperature of about 850° C.

Coupled to the Rotary dryer 6, for controlling the emission of residues to the atmosphere, as well as to capture the fines from free CaO and MgO, there is a cyclone with a set of sleeve filters 8 and a centrifugal fan, from which moisture can be expelled from the system in the form of vapor.

The dry slag 10, with a discharge temperature of about 120° C., is collected and transported by a conveyor-belt, which may be provided with a belt capable of withstanding a temperature of up to 150° C., end feeds an impacting mill 11, such as a double-rotor impact mill. Alternatively, the impact mill may be replaced by a semi-autogenous mill, as for example a VSI (Vertical Shaft Impactor).

The impact mill 11 (or semi-autogenous mil) is intended to promote disaggregation and fragmentation of the larger slags to a grain size of more or less ¼" (6.35 mm).

The slag is an aggregate composed by crystals of amorphous structure, well-formed crystals of greater strength, fine particles of CaO and CaO.MgO and metallic fragments. In this disaggregation and fragmentation process, the slags of greater strength are fragmented into particles smaller than ¼" (6.35 mm); the aggregates composed by crystals of amorphous structure and the aggregates of CaO and CaO.MgO disaggregate individually into fine and superfine particles.

The impact mill 11 (or semi-autogenous mil) is equipped with an aero-classification system, creating a depression inside the mil, so as to drag all fine and superfine particles, by means of a static classifier 12, such as a cyclone, coupled to the aero-classifier.

Cyclones such as the aero-classifier 12 have efficiency to retain particles of, for instance, up to 10 microns, so that smaller particles are collected in a set of sleeve filters 13 connected to the aero-classifier 12, so as to release only air to the atmosphere. The drag depression is created by the centrifugal fan 14 positioned after the set of sleeve filters 13.

At the discharge 15, particles smaller than 100 microns and bigger than 10 microns are collected, which are called "fines", constituted by free CaO, free CaO.MgO and calcium silicates of amorphous structure. At the discharge 16 of the set of sleeve filters, all the particles smaller than 10 microns are collected, which are equally constituted basically by free CaO, free CaO.MgO and calcium silicates of amorphous structure.

After disaggregation and fragmentation in an impact mill 11, the bigger slag particles that are bigger than 150 microns after are collected on a conveyor-belt capable of resisting high temperature and transported to a cooler 17. The cooler 17 provides cooling down to a temperature of about 50° C. by means of an aero-classifier, which can make the heat Exchange and the final removal of all the fine and superfine particles in the aero-classification step carried out in the impact mill 11.

The aero-classifier 17 is provided with a cyclone 18, such as a static classifier of high efficiency, so that the material smaller than 10 microns rejected by the cyclone will be collected in a set of sleeve filters 19. At the discharge of the cyclone 18, the particles smaller than 100 microns and bigger than 10 microns are collected, which are basically constituted by free CaO, free CaO.MgO and calcium silicates of amorphous structure.

At the discharge of the set of sleeve filters 19, the particles smaller than 10 microns are collected, which are equally constituted basically by free CaO, free CaO.MgO and calcium silicates of amorphous structure.

The depression of the aero-classifier 17 to make the heat Exchange and make the depression to retain fines in the cyclone 18 in the set of sleeve filter 19 is provided by a centrifugal fan 20 (dustless air) duly sized, which can release moisture out of the system in the form of vapor.

The material, after cooling and classification in the aero-classifier 17, is collected and transported by a conveyor-belt to the three-deck vibrating sieve 21, where the first deck 23 may be provided with a screen of ¼"; a 4-mm screen may be provided on the second deck 24; and a 2-mm screen may be provided on the third deck 25.

At the over 22 of the first deck 23, a fraction bigger than ¼" is generated, which may return to the impact mill 11, closing the circuit.

At the over of the second deck 24, a fraction smaller than ¼" and bigger than 4 mm is generated. At the over of the third deck 25, a fraction smaller than 4 mm and bigger than 2 mm is generated. At the under of the third deck, a fraction smaller than 2 mm is generated.

The fraction superior to ¼" is processed in a low-intensity magnetic separator 26, generating a non-magnetic slag free from metallic iron (Fe0) and iron monoxide (FeO) 29, already available for use.

The fraction smaller than 4 mm and bigger than 2 mm is processed in a low-density 27, generating a non-magnetic slag free from metallic iron, (Fe0) and iron monoxide (FeO) 30, already available for use.

The fraction smaller than 4 mm and bigger than 2 mm is processed in a low-intensity magnetic separator 28, generating a non-magnetic slag free from metallic iron (Fe0) and of iron monoxide (FeO) 31, already available for use.

The fraction smaller than 2 mm is equally processed in a low-intensity magnetic separator 28, generating a non-magnetic slag free from metallic iron (Fe0) and iron monoxide (FeO) 31, already available for use.

The magnetic separator 26, provided for the fraction smaller than ¼" and bigger than 4 mm further generates a magnetic fraction 32, composed by metallic iron (Fe0) and iron monoxide (FeO or Fe+2). The magnetic separator 27, provided for the fraction smaller than 4 mm and bigger than 2 mm generates a magnetic fraction 33, composed by metallic iron (Fe0) and iron monoxide (FeO or Fe+2). The magnetic separator 28, provided for the fraction smaller than 2 mm generates a magnetic fraction 34, composed by metallic iron (Fe0) and iron monoxide (FeO or Fe+2).

The magnetic fraction 32 (−¼" and +4 mm) is subsequently reprocessed in a low-intensity magnetic separator 35, in which two products are generated, one being concentrated with high metallic iron contents 39 and a second product with high concentration of iron monoxide (FeO or Fe+2) 38.

The magnetic fraction 33 (−4 mm and +2 mm) is subsequently reprocessed in a low-intensity magnetic separator 36, in which two products are generated, namely: one concentrated with high metallic iron contents 41 and a second product with high concentration of iron monoxide (FeO or Fe+2) 40.

The magnetic fraction 34 (−2 mm) is subsequently reprocesses in a low-intensity magnetic separator 37, in which two products are generated, one concentrated with high metallic iron contents 43 and a second product with high concentration of iron monoxide (FeO or Fe+2) 42.

All the magnetic fractions with high metallic contents (Fe0) 39, 41 and 43 are collected on a conveyor-belt and deposited in a silo for reception of metallic iron 44.

All the magnetic fractions with high iron monoxide contents (FeO or Fe+2) 38, 40 and 42 are collected on a conveyor-belt and deposited in a silo for reception of iron monoxide 45.

It will be understood from the above description that various modifications and changes may be made on the preferred embodiments of the present invention, without departing from its true spirit. The above description is provided for illustration only and should not be considered limiting. Only the language of the accompanying claims should guide the limit the scope of this invention.

The invention claimed is:

1. A process for eliminating the expandability of steel-plant slag, the process comprising the steps of:
   a) separating the steel-plant slag by size difference and transporting the steel-plant slag to a processing unit;
   b) feeding a primary crusher with the steel-plant slag and crushing the steel-plant slag depending on their grain size, wherein natural moisture of the steel-plant slag facilitates the crushing of the steel-plant slag into slag material;
   c) collecting the slag material processed by the primary crusher and transporting the slag material to a magnetic separator and removing metallic fragments bigger than a determined grain size;
   d) drying the slag material received from the magnetic separator in a rotary dryer to produce dry slag;
   e) feeding the dry slag to an impact mill that fragments and discharges the dry slag;
   f) performing aero-classification with disaggregation and fragmentation of the dry slag in the impact mill by means of a static classifier that provides a depression inside the impact mill, so as to drag fine and superfine particles of the dry slag that are smaller than a predetermined grain size;
   g) feeding the dry slag particles bigger than the predetermined grain size, after the step of aero-classification with disaggregation and fragmentation, to a cooler in which cooling is provided by means of an aero-classifier, which makes the heat exchange and removes fine and superfine particles that were not collected in the aero-classification step in the impact mill, leaving cooled material;

h) disposing the cooled material on a vibrating sieve having two or more decks provided with screens with predetermined sizes to sieve the cooled material into fractions separated according to their grain sizes;

i) magnetically separating the fractions of cooled material in low-intensity magnetic separators, to separate non-magnetic slag fractions, which are free from metallic iron (Fe0) and from iron monoxide (FeO), and magnetic fractions, which are composed by metallic iron (Fe0) and iron monoxide (FeO or Fe+2); and j) reprocessing said magnetic fractions in low-intensity magnetic separators to concentrate high metallic iron contents and generate a product with high concentration of iron monoxide (FeO or Fe+2).

2. The process for eliminating the expandability of steel-plant slag according to claim 1, wherein prior to step (a) a primary treatment of the steel-plant slag takes place, which comprises the following steps: (i) removing the bigger metallic slurries; (ii) crushing and sequencing; and (iii) magnetic separation for removal of the bigger metallic fragments, including slag particles with average size of 4 inches and slag particles equal to or smaller than 2 inches.

3. The process for eliminating the expandability of steel-plant slag according to claim 1, wherein, in the step of separating the steel-plant slag, the material goes to an improvement unit, which includes a silo equipped with a shoe feeder with capacity of approximately 30 m3.

4. The process for eliminating the expandability of steel-plant slag according to claim 1, wherein, in the crushing step, the fragments are reduced down to a grain size smaller than 2 inches, and in that, for slag particles with size smaller than this granulometry, the material is diverted from the primary crusher.

5. The process for eliminating the expandability of steel-plant slag according to claim 1, wherein the rotary dryer is fed by hot gas provided by a mobile grill furnace that burns biomass, which consists of one or more from: pellet or eucalyptus chips, used pellet fragments, residue of wood from civil construction, pruned leaves and branches of native trees, and in that the mobile grill furnace preferably generates hot gas at a temperature of about 850° C.

6. The process for eliminating the expandability of steel-plant slag according to claim 1, wherein step (d) further comprises controlling the emission of residues to the atmosphere, as well as capturing fines of free CaO and MgO, by means of a cyclone with asset of sleeve filters and a centrifugal fan, to release moisture out of the system in the form of vapor.

7. The process for eliminating the expandability of steel-plant slag according to claim 1, wherein in step (e) the dry slag is dried at a discharge temperature of about 120° C., is collected and transported to the impact mill by a conveyor-belt capable of withstanding a temperature of up to 150° C.

8. The process for eliminating the expandability of steel-plant slag according to claim 1, wherein, in step (e), the disaggregation and fragmentation of the slag takes place in one of a double-rotor impact mill and a semi-autogenous mill with vertical shaft impact.

9. The process for eliminating the expandability of steel-plant slag according to claim 1, wherein, in step (e) the granulometry of the disaggregation and fragmentation of the slag is predetermined at ¼" (6.35 mm).

10. The process for eliminating the expandability of steel-plant slag according to claim 1, wherein, in steps (f) and (g), particles of up to 10 microns are retained by means of the aero-classifier, and particles smaller than these are collected in a set of sleeve filters, which release only air is released to the atmosphere, and in that a drag depression is created by a centrifugal fan, positioned after the set of sleeve filters.

11. The process for eliminating the expandability of steel-plant slag according to claim 10, wherein the collection of particles smaller than 100 microns and bigger than 10 microns takes place at a discharge of the cyclone; and in that the collection of particles smaller than 10 microns takes place at a discharge of the set of sleeve filters.

12. The process for eliminating the expandability of steel-plant slag according to claim 1, wherein, in step (g), the cooling is made at a temperature of approximately 50° C.

13. The process for eliminating the expandability of steel-plant slag according to claim 1, wherein, in step (g), the aero-classification in the cooler is made by means of a high efficiency static classifier, in which the material smaller than 10 microns rejected by the cyclone is collected in a set of sleeve filters; and in that the collection of particles smaller than 100 microns and bigger than 10 microns takes place at the discharge of the cyclone (18).

14. The process for eliminating the expandability of steel-plant slag according to claim 1, wherein a heat exchange takes place in a depression of the aero-classifier, and the retention of the fine particles in the cyclone and of the superfine particles in the set of sleeve filters is provided by a centrifugal fan of the dustless air, capable of releasing moisture out of the system in the form of vapor.

15. The process for eliminating the expandability of steel-plant slag according to claim 1, wherein, in step (h), the sieving at a first deck is carried out by means of a ¼"-screen; and the sieving at a second deck is carried out by means of a 2-mm screen.

16. The process for eliminating the expandability of steel-plant slag according to claim 15, wherein in an over of the first deck, a fraction bigger than ¼" is generated, which may return to the impact mill, completing a circuit.

17. The process for eliminating the expandability of steel-plant slag according to claim 1, wherein, in step (j), the magnetic fractions with high metallic iron contents (Fe0) are collected on a conveyor-belt and deposited in a silo for reception of metallic iron; and the magnetic fractions with high iron monoxide contents (FeO or Fe+2) are collected on a conveyor-belt and deposited in a silo for reception of iron monoxide.

18. A system for eliminating the expandability of steel-plant slag, the system comprising:

a) a primary crusher for reducing fragments of the slag according to their granulometry facilitated by a natural moisture of the slag;

b) a magnetic separator for removing bigger metallic fragments larger than a determined granulometry;

c) a rotary dryer for drying the slag free from the bigger metallic fragments;

d) an impact mill that receives the dry slag from the dryer and disaggregates and fragments slag particles down to a predetermined granulometry;

e) a static classifier connected to the impact mill for aero-classification so as to drag fine particles and superfine particles of the slag particles;

f) a cooler for cooling the slag particles larger than a predetermined granulometry by means of heat exchange and removal of the fine and superfine particles that have not been collected by the impact mill;

g) a vibrating sieve provided with two or more decks with screens of predetermined sizes for sieving separated fractions of the slag according to their granulometry;

h) low-intensity magnetic separators for separating the particles, with generation of fractions of non-magnetic slag free from metallic iron (Fe0) and from iron monoxide (FeO), and of magnetic fractions composed by metallic iron (Fe0) and iron monoxide (FeO or Fe+2); and i) low-intensity magnetic separators for reprocessing said magnetic fractions, with generation of concentrate with high metallic contents and a product with high concentration of iron monoxide (FeO or Fe+2).

19. The system for eliminating the expandability of the steel-plant slag according to claim 18, wherein an improvement unit that includes a silo equipped with a shoe feeder with capacity of approximately 30 m$^3$ is provided to transport the material to the primary crusher.

20. The system for eliminating the expandability of the steel-plant slag according to according to claim 18, wherein the primary crusher is sized to fragment the slag down to a granulometry smaller than 2 inches, and a deviation from the primary crusher is provided for slags already having this granulometry.

21. The system for eliminating the expandability of the steel-plant slag according to according to claim 18, wherein the rotary dryer is fed with hot gas derived from a mobile grill furnace, based on burning biomass, which consists of one or more of: pellet eucalyptus chips, used pellet fragments, residues of wood from the civil construction, pruned leaves and branches from native trees capable of generating hot gas at a temperature of about 850° C.

22. The system for eliminating the expandability of the steel-plant slag according to any claim 18, wherein the dryer is further connected to a cyclone with a set of sleeve filters for controlling the emission of residues to the atmosphere, as well as for capturing fines of free CaO and MgO and a centrifugal fan to release moisture out of the system in the form of vapor.

23. The system for eliminating the expandability of the steel-plant slag according to claim 18, wherein a conveyor-belt provided with a belt capable of withstanding a temperature of up to 150° C. transports the dry slag at a temperature of about 120° C. to the impact mill.

24. The system for eliminating the expandability of the steel-plant slag according to claim 18, wherein the impact mill is one of a double-rotor impact mill and a semi-autogenous mill with vertical shaft impact.

25. The system for eliminating the expandability of the steel-plant slag according to claim 18, wherein the static classifier includes an aero-classifier that provides retention of particles of up to 10 microns, and particles that are smaller than this size are collected in a set of sleeve filters that release only air to the atmosphere; and wherein the aero-classifier includes a drag depression is created by a centrifugal fan positioned after the set of sleeve filters.

26. The system for eliminating the expandability of the steel-plant slag according to claim 25, wherein a discharge of the cyclone collects particles that are smaller than 100 microns and bigger than 10 microns; and a discharge of the set of sleeve filter collects particles smaller than 10 microns.

27. The system for eliminating the expandability of the steel-plant slag according to claim 18, wherein the cooler reduces the temperature of the material down to about 50° C.

28. The system for eliminating the expandability of the steel-plant slag according to claim 18, wherein the cooler makes the aero-classification by means of a high efficiency static classifier, wherein the material smaller than 10 microns rejected by the cyclone is collected in a set of sleeve filters; and wherein the collection of particles smaller than 100 microns and bigger than 10 microns takes place at the discharge of the cyclone.

29. The system for eliminating the expandability of the steel-plant slag according to claim 18, wherein the depression of the aero-classifier where the heat exchange takes place promotes retention of the fine particles in the cyclone; wherein the set of sleeve filters is provided so as to collect material classified as superfine particles, and a centrifugal fan of the dustless air releases moisture out of the system in the form of vapor.

30. The system for eliminating the expandability of the steel-plant slag according to claim 18, wherein a first deck sieving by means of a ¼"-screen; a second deck carries out the sieving by means of a 4-mm screen; and a third deck caries out the sieving by means of a 2-mm screen.

31. The system for eliminating the expandability of the steel-plant slag according to claim 30, wherein at an over of the first deck it produces a fraction bigger than ¼", which may return to the impact mill, closing the circuit.

32. The system for eliminating the expandability of the steel-plant slag according to claim 18, wherein, in step (i), the magnetic fractions with high metallic contents (Fe0) are collected on a conveyor-belt and deposited in a silo for reception of metallic iron; and the magnetic fractions with high contents of iron (FeO or Fe+2) are collected on a conveyor-belt and deposited in a silo for reception of iron monoxide.

* * * * *

UNITED STATES PATENT AND TRADEMARK OFFICE
CERTIFICATE OF CORRECTION

PATENT NO. : 10,584,060 B2
APPLICATION NO. : 15/512686
DATED : March 10, 2020
INVENTOR(S) : Sidnei Luiz Baumgartenn Page 1 of 1

It is certified that error appears in the above-identified patent and that said Letters Patent is hereby corrected as shown below:

On the Title Page

In (71) Applicant, insert a --,-- between "Indústria" and "Comércio".

In the Claims

In Column 8, Claim 13, Line 27, delete "(18)".

Signed and Sealed this
Twenty-second Day of September, 2020

Andrei Iancu
*Director of the United States Patent and Trademark Office*